July 5, 1960 A. E. WETHERBEE, JR 2,943,821
DIRECTIONAL CONTROL MEANS FOR A SUPERSONIC VEHICLE
Filed Dec. 30, 1950 2 Sheets-Sheet 1
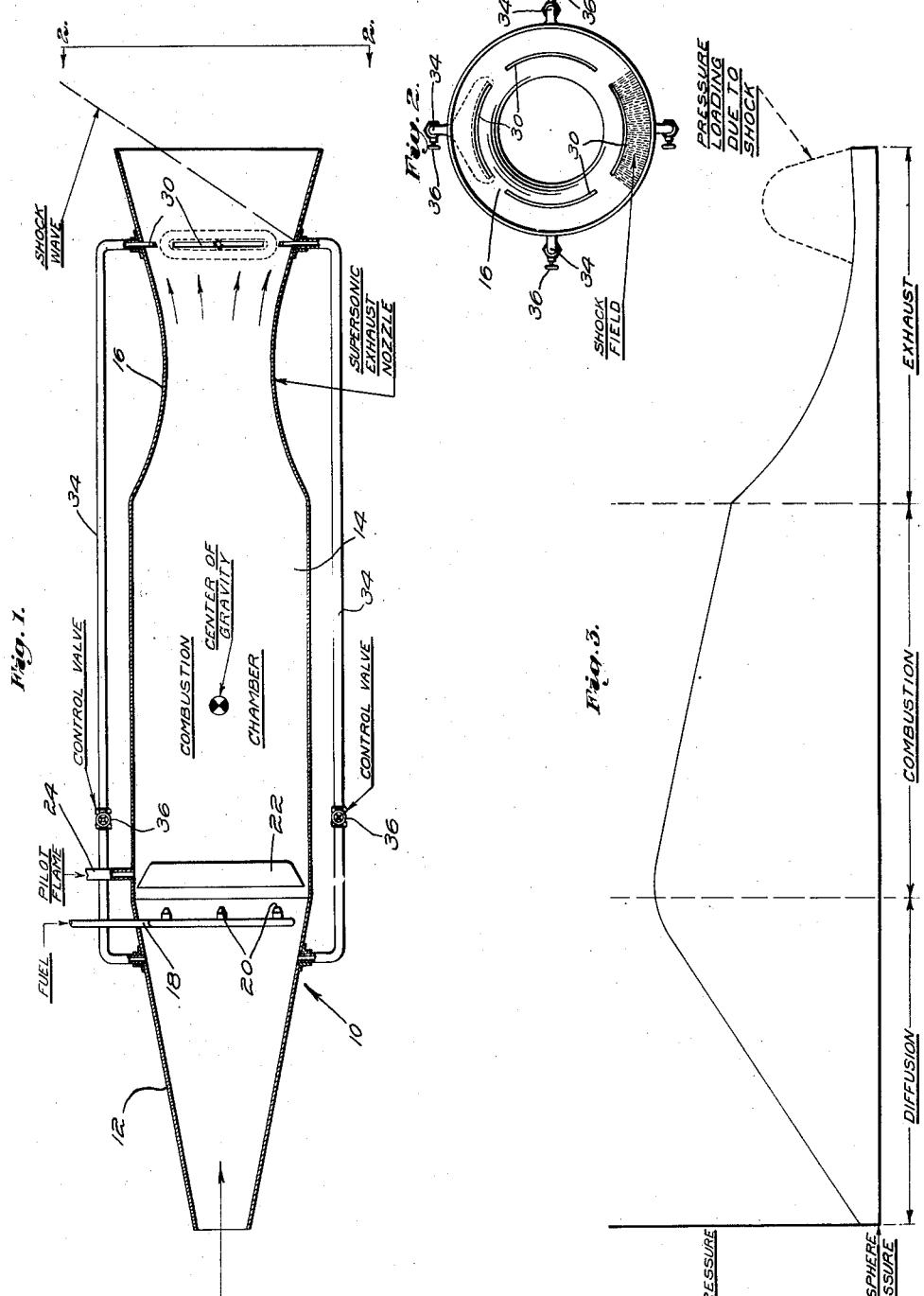
Inventor
Arthur E. Wetherbee Jr.
by Leonard F. Wehlind
Agent

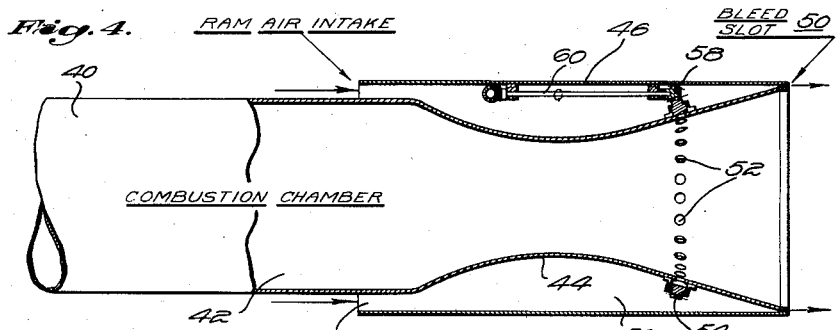
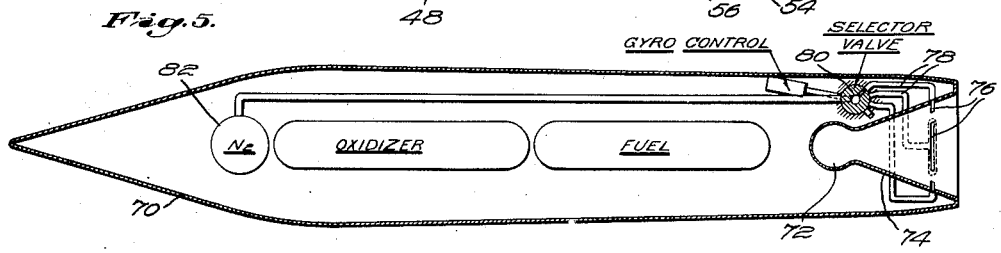
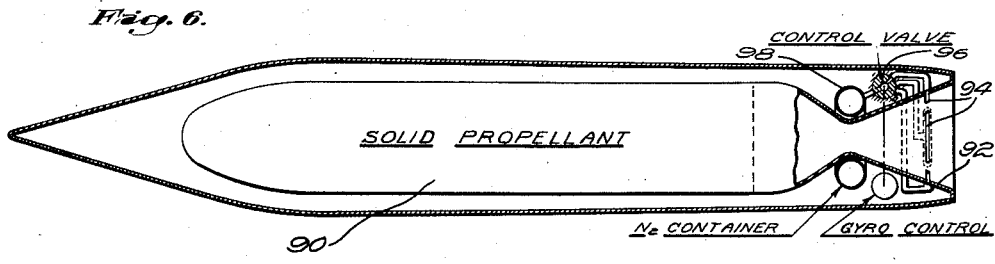
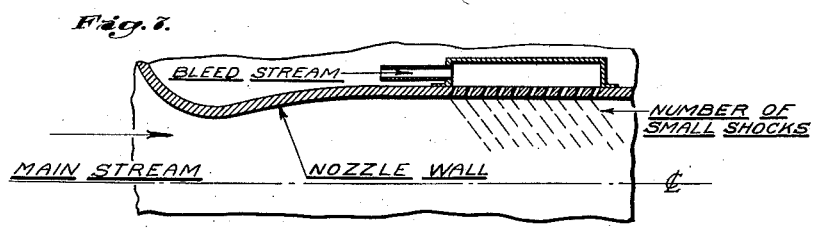
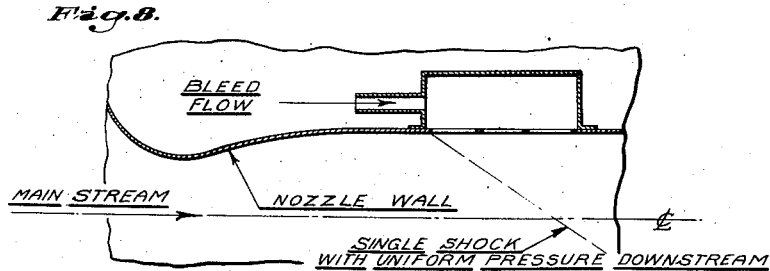

United States Patent Office 2,943,821
Patented July 5, 1960

2,943,821

DIRECTIONAL CONTROL MEANS FOR A SUPERSONIC VEHICLE

Arthur E. Wetherbee, Jr., Newington, Conn., assignor to United Aircraft Corporation, East Hartford, Conn., a corporation of Delaware Filed Dec. 30, 1950, Ser. No. 203,641

13 Claims. (Cl. 244—52)

This invention relates to means for providing directional control for a vehicle propelled by a supersonic propulsion stream.

It is an object of this invention to provide a control for a vehicle having supersonic flow in the exhaust propulsion nozzle thereof.

Another object of this invention is to provide a control of the type described wherein shock waves are selectively produced adjacent the inner surface of the exhaust nozzle whereby forces are produced to vary the direction of movement of the vehicle.

A still further object of this invention is to provide a shock type control for a vehicle having a supersonic exhaust nozzle whereby fluid under pressure is selectively introduced into the nozzle stream and at spaced points along the nozzle periphery to create controlling shock waves which in turn produce turning moments about the center of gravity of the vehicle.

Another object of this invention is to provide a control system for a vehicle which is independent of forward velocity of the vehicle and devoid of external aerodynamic influences.

These and other objects of this invention will become readily apparent from the following detailed description of the accompanying drawings in which:

Fig. 1 is a schematic illustration of a ramjet power plant having a propulsion nozzle utilizing this invention.

Fig. 2 is a view taken along the line 2—2 of Fig. 1.

Fig. 3 is an illustration of the pressure in the ramjet unit.

Fig. 4 is an illustration of another form of this invention as applied to a ramjet unit wherein ram air is utilized for creating the shock in the nozzle.

Fig. 5 is a schematic illustration of the use of this invention in connection with a rocket type vehicle; and Fig. 6 is another illustration of the use of this invention in connection with a rocket vehicle or booster rocket utilizing a solid propellant; and Figs. 7 and 8 illustrate modifications of this invention.

Fig. 1 illustrates a ramjet unit 10 for a vehicle of the type for example shown in Figs. 5 and 6. The ramjet unit comprises a diffuser section 12, a combustion chamber 14 and a supersonic exhaust nozzle 16. Fuel under pressure may be injected via a fuel line 18 and through one or more nozzles 20 into the entrance of the combustion chamber 14. A flame spreader 22 may be provided to insure adequate flame propagation when the fuel air mixture is ignited by a pilot flame 24 or other means of ignition. The combustion products are led to the convergent-divergent nozzle 16 which accelerates the gases to supersonic velocities. It is well known that the convergent portion of the nozzle accelerates subsonic flow. Hence the subsonic flow eventually reaches supersonic velocity. In contrast to subsonic flow supersonic flow is accelerated by diverging the confined stream. As a result further supersonic acceleration is obtained in the divergent portion of the nozzle 16.

Inasmuch as the vehicle will have a center of gravity substantially as shown in Fig. 1, it is desirable to produce a simple but positive control force at a point spaced from the center of gravity to directionally control the vehicle in flight. To this end a plurality of peripheral slots 30 (see also Fig. 2) are provided at peripherally spaced intervals in the wall of the nozzle 16 adjacent the aft end thereof. A plurality of conduits 34 connect the high pressure end of the diffuser to the slots 30 so that high pressure air can be injected into the supersonic stream of the nozzle 16 to create shock waves which emanate from the inner wall of the nozzle and which preferably extend to a point outside the confines of the nozzle as illustrated for example in Fig. 1. Control valves 36 may be provided in each of the conduits 34 so as to selectively direct air to one or more of the slots 30.

It will be noted that since the fluid stream in the nozzle is of supersonic velocity a deflection of the fluid will produce an oblique shock. The deflection of the fluid here is caused by the injection of compressed air through the slots 30.

As shown in Fig. 3, the pressure in the ramjet unit rises in the diffuser, drops slightly during combustion and thereafter drops considerably in the exhaust nozzle 16. The flow of gases is considerably increased to a supersonic velocity in the exhaust nozzle. It should be noted that the pressure curve illustrated in Fig. 3 is relative to the ambient air and hence the base line of the chart in Fig. 3 will represent the pressure of the surrounding atmosphere. Inasmuch as there is a definite pressure rise in a region immediately following a shock wave there will be a pressure rise in the nozzle 16, as shown by the dotted line in Fig. 3 whenever air is injected through the slots 30. It is then readily apparent that such a local pressure rise adjacent any one of the slots 30 will cause an unbalance of pressure within the nozzle so as to create a moment about the center of gravity of the vehicle to vary the direction thereof.

Referring to Fig. 4, another form of this invention is illustrated. A portion of a ramjet 40 is shown having a combustion chamber 42 and a supersonic exhaust nozzle 44. An annular member or cowl 46 surrounds the nozzle 44 and terminates at its forward end in an annular ram air intake 48. A small bleed slot 50 is provided between the aft end of the cowl 46 and the nozzle 44 to permit a slight amount of outflow so as to prevent an excessive temperature rise as a result of heat transfer from the nozzle proper. The wall at the aft end of the nozzle 44 is provided with a plurality of openings 52 which are surrounded by a rotatable collar 54. The collar 54 has a number of cooperating openings so that by proper rotation certain groups of the holes 52 will be open to the chamber 56 formed between the cowl 46 and the nozzle 44. In this manner, ram-air pressure built up within the chamber 56 can be selectively injected into the nozzle stream to create shock waves in a manner similar to that illustrated in Fig. 1. The rotatable collar 54 may include external teeth thereon which cooperate with a bevel gear 58 driven by a shaft 60.

Referring to Fig. 5, a missile 70 is shown having a fuel tank and an oxidizer tank which feed the contents thereof to a combustion chamber 72 from which gases are emitted into the supersonic nozzle 74. As shown in Fig. 1, and also illustrated herein, a plurality of slots 76 are provided in the nozzle 74 which in turn are connected by lines 78 to a selector or control valve 80. Nitrogen or other gas under pressure in a reservoir, as for example, 82, may be connected to the valve 80 for selectively directing the gas under pressure to one or more of the slots 76 and thus producing shock-wave control forces on the nozzle 74 in the manner described hereinbefore. The control valve 80 may be operated by a gyro control, as illustrated, or any other similar automatic or remotely operated control.

Referring to the Fig. 6 illustration, a propulsion unit is illustrated comprising a solid propellant container 90 which is adapted to burn at a high rate of combustion and to exhaust the gases generated thereby through a supersonic nozzle 92. As described in connection with Fig. 5 and also as herein illustrated, a plurality of slots 94 are provided which in turn are connected by conduits to a control valve 96. The control valve 96 may be operated by a gyro or similar control and may be fed nitrogen or other gas under pressure from a toroidal shaped chamber 98. By utilizing a compressed gas container of this shape the entire propulsion unit may be made compact and its frontal area relatively small.

In each of the foregoing instances the shock producing fluid has been illustrated as being emitted through narrow slots or small holes. Where relatively small holes are utilized a number of such holes may be formed as a bank, each of the holes being spaced circumferentially and also axially of the nozzle wall as shown for example in Figs. 4 and 7. The fluid being bled through the holes at relatively high velocity produces an individual shock adjacent each hole. Since the desired effect is to produce one shock front with a substantially uniform pressure field behind it, the shock control force may be rendered more effective by injecting gases at low velocity but at essentially the pressure to be expected behind the shock and by utilizing relatively large holes or slots in the nozzle wall (see Fig. 8). As a result a more uniform pressure distribution is obtained over the working surface which in turn minimizes the flow required for control purposes.

As a result of this invention it is obvious that a very simple yet positive control means has been provided for supersonic vehicles and the like which has the advantage over other control systems since there is no external aerodynamic drag or other undesirable incidental aerodynamic defects which will derogate from the maximum efficiency of such a vehicle. Further, this control mechanism being simple in operation insures positive operation but at the same time producing large control forces at a minimum loss in efficiency.

It should be noted that the subject control is equally applicable to turbo-jet power plants as well as liquid or solid propellant rockets. Of special note is the fact that the control system described herein provides control forces completely independent of external aerodynamics. Thus a control system of this type will perform well at zero flight speeds or in rarefied atmospheres where conventional aerodynamic control surfaces are ineffective.

Although certain embodiments of this invention have been illustrated and described herein, it will be evident that various changes and modifications may be made in the construction and arrangement of the various parts without departing from the scope of this novel concept.

What it is desired to obtain by Letters Patent is:

1. In a vehicle having a combustion chamber and a source of fuel for burning in said chamber, a duct receiving the combustion gases from said combustion chamber, means for moving said gases at supersonic velocity including a convergent-divergent nozzle and means for selectively creating shock waves emanating from the inner wall of said nozzle and trailing outboard thereof comprising a source of fluid under pressure, a plurality of openings in the wall of said nozzle, and controllable valve means for selectively controlling the flow of fluid from said source to said openings.

2. In a vehicle having a combustion power plant and a propulsion nozzle, means providing a fluid stream of supersonic velocity moving axially of said nozzle, passage means in the wall of said nozzle, means for receiving air from the free stream and conducting it to said passage means for discharge internally of said nozzle in a direction transversely of the axis of flow through said nozzle, and means for selectively controlling the peripheral position of discharge into said nozzle.

3. In a vehicle having a combustion chamber and a propulsion nozzle receiving fluid from said chamber including means providing a fluid flow therethrough at supersonic velocity, an annular ram air intake surrounding said vehicle, a plurality of peripheral openings in the wall of said nozzle including valve mechanism for selectively opening and closing said openings, and means for conducting said ram air to said openings for discharge internally of said nozzle.

4. In a vehicle having a power plant including a combustion chamber, means for conducting combustion charging elements to said chamber, a propulsion nozzle receiving gases from said chamber including means for discharging said fluid at supersonic velocity, passage means in the wall of said nozzle comprising a plurality of peripherally spaced openings positioned along the nozzle axes adjacent the point where the flow is supersonic, a source of gas under pressure, means for conducting gas under pressure from said source to said passage means, and valve means for selectively directing said gas under pressure to separate openings and creating shock waves in said nozzle.

5. In a vehicle according to claim 4 wherein said valve means is operated by a mechanism responsive to the direction of movement of said vehicle.

6. In a vehicle having a power plant including a combustion chamber, means for conducting fuel to said chamber, a propulsion nozzle receiving gases from said chamber, means for discharging said gases at supersonic velocity, and means for creating shock waves in said supersonic stream adjacent the aft end of said nozzle to control the vehicle comprising, a plurality of peripherally spaced openings in the wall of said nozzle, means cooperating with said nozzle for selectively opening and closing said openings, a source of fluid under pressure, and means for conducting said fluid under pressure to said openings for injection into said nozzle substantially transversely to the axis of the stream within the nozzle.

7. In a vehicle having a combustion power plant, means receiving combustion products from said plant and providing a flow of supersonic fluid, a duct receiving said supersonic fluid, a source of fluid under pressure, a plurality of peripherally spaced openings in the wall of said duct, and controllable means for conducting said fluid under pressure to separate openings and creating shock waves in the supersonic fluid.

8. In a vehicle having a combustion power plant, an exhaust nozzle for said power plant longitudinally spaced from the center of gravity of the vehicle, means for generating a stream of supersonic fluid in said nozzle, a source of fluid under pressure, a plurality of peripherally spaced openings in the wall of said nozzle, and means for conducting said fluid under pressure to said openings for ejection into said nozzle to create shock waves and high pressure regions in said nozzle and to control the vehicle including mechanism for selectively conducting said fluid under pressure to a limited number of said openings.

9. In a vehicle having a power plant including a propulsion nozzle receiving fluid from said power plant, the fluid moving through said nozzle at supersonic velocity, said nozzle including convergent-divergent wall portions, a source of fluid under pressure, a plurality of peripherally spaced openings in the divergent wall portion of said nozzle, and controllable means operatively connected to said source for selecting a number less than all of said openings to which fluid from said source is to be delivered.

10. In a vehicle having a power plant including a propulsion nozzle receiving fluid from said power plant, the fluid moving through said nozzle at supersonic velocity, said nozzle including convergent-divergent wall portions, a source of fluid under pressure, a plurality of peripherally spaced openings in the divergent wall portion of said nozzle, and means operatively connected to said source for directing fluid from said source to a limited number of said openings.

11. In a vehicle having a combustion chamber and a source of fuel for burning in said chamber, a propulsion nozzle receiving gases from said combustion chamber including means for moving said gases at supersonic velocity, and means for selectively creating shock waves emanating from peripherally spaced positions on the inner wall of said nozzle comprising a source of fluid under pressure, passage means in the wall of said nozzle, and controllable valve means for selectively controlling the flow from said source to said passage means.

12. In a vehicle having a propulsion nozzle, said nozzle being spaced from the center of gravity of the vehicle, means for producing a stream of supersonic velocity in said nozzle, means for creating shock waves extending from the internal wall of said nozzle comprising a source of fluid under pressure, passage means in the wall of said nozzle, and controllable valve means for selectively conducting said fluid to said passage means, said valve means being controlled whereby shock waves emanate from only a part of the periphery of the wall of said nozzle.

13. In a vehicle having a combustion power plant including an air inlet and means for compressing said air, a combustion chamber receiving air from said compressor, a propulsion nozzle receiving gases of supersonic velocity from said combustion chamber and discharging said gas externally of the vehicle, passage means peripherally disposed in the aft wall portion of said nozzle for discharging air therefrom, and means for bleeding compressed air from said compressor and conducting same to said passage means including at least one control valve therefor, said last mentioned means creating shock waves in said nozzle which waves are unsymmetrical relative to the longitudinal axis of the nozzle to control the direction of said vehicle.

References Cited in the file of this patent

UNITED STATES PATENTS

| | | |
|---|---|---|
| 253,215 | Maynard | Feb. 7, 1882 |
| 855,165 | Cutter | May 28, 1907 |
| 958,996 | Duc | May 24, 1910 |
| 1,879,187 | Goddard | Sept. 27, 1932 |
| 2,528,354 | Flanagan | Oct. 31, 1950 |
| 2,540,594 | Price | Feb. 6, 1951 |
| 2,694,898 | Stauff | Nov. 23, 1954 |